(12) United States Patent
Katayama et al.

(10) Patent No.: US 7,222,227 B2
(45) Date of Patent: May 22, 2007

(54) CONTROL DEVICE FOR SPECULATIVE INSTRUCTION EXECUTION WITH A BRANCH INSTRUCTION INSERTION, AND METHOD FOR SAME

(75) Inventors: Yasuhiro Katayama, Kawasaki (JP); Masashi Sasahara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 343 days.

(21) Appl. No.: 10/370,508

(22) Filed: Feb. 24, 2003

(65) Prior Publication Data
US 2004/0078559 A1 Apr. 22, 2004

(30) Foreign Application Priority Data
Oct. 22, 2002 (JP) ............................. 2002-307591

(51) Int. Cl.
| | |
|---|---|
| G06F 9/30 | (2006.01) |
| G06F 9/40 | (2006.01) |
| G06F 15/00 | (2006.01) |
| G06F 7/38 | (2006.01) |
| G06F 9/00 | (2006.01) |
| G06F 9/44 | (2006.01) |

(52) U.S. Cl. ..................................... 712/239; 712/214
(58) Field of Classification Search ................. 712/239
See application file for complete search history.

(56) References Cited

U.S. PATENT DOCUMENTS

| | | | |
|---|---|---|---|
| 5,778,245 A * | 7/1998 | Papworth et al. ............. 712/23 |
| 6,845,442 B1 * | 1/2005 | Lepak et al. ................. 712/214 |
| 6,918,030 B2 * | 7/2005 | Johnson ....................... 712/225 |
| 2003/0172255 A1 * | 9/2003 | Dundas ....................... 712/225 |

OTHER PUBLICATIONS

Mikko H. Lipasti, et al. "Exceeding the Dataflow Limit via Value Prediction," Proceedings of the 29th Annual IEEE/ACM International Symposium on Microarchitecture, MICRO-29, 1996, pp. 226-237.
Dean M. Tullsen, et al. "Storageless Value Prediction Using Prior Register Values," Proceedings of the 26th International Symposium on Computer Architecture, 1999, pp. 207-279.
Chao-ying Fu, et al. "Value Speculation Scheduling for High Performance Processors," SIGPLAN Not., vol. 33, No. 11, Nov. 1998, pp. 262-271.

* cited by examiner

*Primary Examiner*—Eddie Chan
*Assistant Examiner*—Brian Johnson
(74) *Attorney, Agent, or Firm*—Oblon, Spivak, McClelland, Maier & Neustadt, P.C.

(57) ABSTRACT

A device and method for implementing prediction verification control and recovery control in speculative instruction execution when a prediction error occurs with simple hardware configuration are disclosed. This device includes a branch instruction insertion unit that dynamically inserts a branch instruction subsequent to a target instruction for prediction in a group of instructions consisting of the target instruction for prediction for which a value is to be predicted and a subsequent instruction. An instruction issuing unit speculatively issues a subsequent instruction to an execution unit without waiting for the execution result of the target instruction for prediction and an execution unit executes the issued instructions. A branch prediction control unit predicts the branch destination of a branch instruction, performs branch prediction verification, and performs value prediction verification by comparing the predicted value with the execution result of the target instruction for prediction that has been executed upon execution of the inserted branch instruction.

14 Claims, 13 Drawing Sheets

FIG. 3

```
                Sample Sequence 1 lw  S1, 0(S10) ; #   load  word : S1 ← Mem[S10+0]
            #  LOAD 1-WORD DATA FROM ADDRESS (S10+0)
                IN MAIN MEMORY
addi S2, S1, 4 ; # add  immediate ; S2 ← S1+4
add S3, S1, S1 ; # add ; S3 ← S1+S1
```

```
Sample Sequence 2
lw   S1,0(S10) ; # load word ; S1 ←Mem[S10+0]
addi S2,S1,4  ; # add immediate ; S2 ←S1+4
add  S3,S1,S1 ; # add ; S3 ←S1+S1
lw   S1,0(S11) ; # load word ; S1 ←Mem[S11+0]
addi S4,S1,8  ; # add immediate ; S2 ←S1+8
```

```
Sample Sequency 3
lw   R40,0(R10) ; # load word ; S1 ←Mem[S10+0]
addi R2,R40,4  ; # add immediate ; S2 ←S1+4
add  R3,R40,R40 ; # add ; S3 ←S1+S1
lw   R1,0(R11) ; # load word ; S1 ←Mem[S11+0]
addi R4,R1,8   ; # add immediate ; S4 ←S1+8
```

FIG. 10

```
                  Sample Sequence 4
    lw Rm, 0(R10) ; #   load word : S1 ← Mem[S10+0]
      bne Rm, Rn, L1 ; # branch not equal ; if (Rm ≠ Rn) then goto L1
L1 : addi R2, Rn, 4 ; # add immediate : S2 ← S1+4
    add R3, Rn, Rn ; # add : S3 ← S1+S1
```

FIG. 11

```
                  Sample Sequence 5
L1 : lw Rm, 0(R10) ; #   load word : S1 ← Mem[S10+0]
    bne Rm, Rn, L1 ; # branch not equal ; if (Rm ≠ Rn) then goto L1
    addi R2, Rn, 4 ; # add immediate : S2 ← S1+4
    add R3, Rn, Rn ; # add : S3 ← S1+S1
```

FIG. 12

```
                  Sample Sequence 6
    lw Rm, 0(R10) ; #   load word : S1 ← Mem[S10+0]
      beq Rm, Rn, L1 ; # branch equal ; if (Rm = Rn) then goto L1
L1 : addi R2, Rn, 4 ; # add immediate : S2 ← S1+4
    add R3, Rn, Rn ; # add : S3 ← S1+S1
```

FIG. 13

```
              Sample Sequence 7
lw  S1,0(S10) ; #   load word : S1 ← Mem[S10+0]
sub S4,S5,S6 ; # subtract ; S4 ← S5-S6
addi S2,S1,4 ; # add immediate ; S2 ← S1+4
addi S3,S1,S1 ; # add ; S3 ← S1+S1
```

FIG. 14

```
              Sample Sequence 8
  lw  Rm, 0(R10) ; #   load word : S1 ← Mem[S10+0]
  sub R4, R5, R6 ; # subtract ; S4 ← S5-S6
  bne Rm, Rn, L1 ; # branch not equal ; if (Rm ≠ Rn) then goto L1
L1 : addi R2, Rn, 4 ; # add immediate : S2 ← S1+4
  add R3, Rn, Rn ; # add : S3 ← S1+S1
```

CONTROL DEVICE FOR SPECULATIVE INSTRUCTION EXECUTION WITH A BRANCH INSTRUCTION INSERTION, AND METHOD FOR SAME

CROSS-REFERENCE TO RELATED APPLICATIONS

This application is based upon and claims the benefit of priority from the prior Japanese patent application No. 2002-307591, filed on Oct. 22, 2002; the entire contents of which are incorporated herein by reference.

BACKGROUND OF THE INVENTION

1. Field of the Invention

The present invention relates to a speculative instruction execution control device and a method for the same. In particular, in a processor that has a prediction unit for speculatively executing computer instructions in order to increase processing speed, it relates to technology for easily implementing with a simple hardware configuration value prediction verification control for speculative instruction execution, and a recovery control when a prediction error occurs.

2. Description of Related Art

Speculative instruction execution is used as a method for increasing computer speed, namely processor speed. Speculative execution means that an instruction is speculatively executed in conformity with a prediction made by a prediction mechanism in a computer. Various methods have been suggested. Generally, such speculative execution is utilized in a pipelined processor.

A first example of this speculative execution includes branch prediction, that is, prediction of which instruction is the branch destination instruction of a branch instruction. With this branch instruction, instruction to be subsequently executed (i.e., fetched) by a processor, which is determined as a result of branch instruction execution, is predicted in order for the subsequent instruction to be fetched without waiting for branch instruction execution.

When branch prediction is not performed, a processor cannot fetch the subsequent instruction until the execution result of this branch instruction is obtained after fetching the branch instruction. Accordingly, in a pipelined processor, a bubble, namely a cycle in which no processing is performed, occurs between the branch instruction and instruction subsequent to this branch instruction. This occurrence of a bubble becomes a factor in the drop in processing speed of a processor.

Meanwhile, when performing branch prediction, since subsequent instruction is fetched without waiting for branch instruction execution, bubbles are reduced and this allows an increase in the processing speed of the processor if branch prediction is correct. However, if branch prediction is incorrect (i.e., prediction error) when branch prediction is performed, since speculatively fetched instructions are instructions not normally executed, it is necessary to disable such instructions and re-fetch correct instructions. The number of times (cycles) required to disable these instructions and re-execute correct instructions when a prediction error occurs are referred to as the prediction error penalty.

The overhead (the drop in processing speed of the processor) due to this prediction error penalty often exceeds the overhead in the case where branch prediction is not performed. This is because extra cycles may be needed to disable speculatively executed instructions. In recent years, processors have aimed to reduce this overhead due to such prediction error and increase processing speed by improving the accuracy of branch prediction.

A second example of speculative execution includes load value prediction, that is, prediction of a load value, which is the data value to be loaded into a processor in conformity with a load instruction. One of the problems in increasing the speed of a processor is that, in comparison with instruction for performing an arithmetic operation or logical operation, the delay time of an instruction for performing data access such as a load instruction or store instruction is longer. In recent years, while reduction in the processing time required to access data in memory still lags, progress has been made in shortening the processing time for arithmetic operations and logical operations. As a result, the difference between the two has become wider. It should be noted that memory herein may be a main memory located external to a processor, or in a processor including cache memory (also simply referred to as a cache), it may be cache memory.

For example, assuming that an arithmetic operation instruction that uses data loaded as a result of a load instruction is included in a program, this operation cannot be executed until the value to be loaded is obtained as a result of the load instruction since this subsequent arithmetic operation instruction has dependency on this load instruction. Accordingly, as the time required for load instruction execution increases, the lag of the instruction execution having dependency on this load instruction increases, and as a result, the processing speed of the processor drops.

In load value prediction, the data value to be loaded with a load instruction is predicted, and this predicted data value is used for instructions subsequent to this load instruction (a. load value prediction). It is possible to speculatively execute subsequent instructions having dependency on this load instruction while executing the load instruction using the predicted data value (b. speculative execution of subsequent instructions).

In the case where the load value prediction is correct, that is, in the case where the predicted load value is equal to the actual execution result of the load instruction, subsequent instructions speculatively executed may be completed at the point in time where load instruction is completed. Accordingly, in comparison with the case where load value prediction is not performed, the processing speed of the processor may increase for the number of cycles required to execute subsequent instructions that were speculatively executed. On the other hand, as with other prediction mechanisms for, for example, branch prediction, in the case where a load value prediction is incorrect, it is necessary to disable the speculatively executed subsequent instruction and re-execute that instruction, which results in a prediction error penalty occurring (c. prediction verification, d. disabling and re-execution of instruction).

Various algorithms have been suggested as the prediction algorithm for performing load value prediction. Since a value to be loaded from memory by the load instruction may be known only upon executing a program, predicting a value to be loaded when compiling a program, or static prediction, is difficult. Accordingly, a load value is predicted wholly by using data during program execution (dynamic prediction). This load value prediction is based on the knowledge that the same load instruction, in other words a load instruction in the same address in the program, has a statistically high probability of loading the same value. In other words, since the same load instruction has a high probability of reloading a value that was loaded in the past, there may be a high probability of obtaining the correct prediction value.

Next, an example of a conventional processor configuration for executing load value prediction is described.

FIG. 1 is an example of a processor configuration having a load value prediction unit.

Main memory 121 is a memory located external to a processor 110, and stores instructions (programs) and data.

An instruction fetch unit (IFU) 111 includes a program counter (PC) 111b, and fetches instruction (D11) (instruction fetch) to the processor 110 from an address in main memory 121 specified by value of the program counter 111b. The fetched instruction is temporarily held in an instruction window buffer (IWB) 112.

The instruction window buffer 112 may hold a plurality of instructions. The instruction window buffer 112 issues instructions to appropriate execution units 114a, 114b, or a load/ store unit 113.

The load/store unit (LSU) 113 and execution units (EX) 114a and 114b are units for executing the respective calculations thereof.

The load/store unit 113 executes load instructions and store instructions. The execution units 114a and 114b perform operations other than load instructions and store instructions. For example, integer operations, logical operations, and floating point operations are performed, but they are not limited to these operations.

A register file (RF) 117 is a group of registers included in the processor. The register file 117 transmits necessary operands (operation values) to the load/store unit 113 and execution units 114a and 114b, respectively, and writes the operation results from those units into the internal register.

A commit unit (CMT) 118 controls the timing when the operation result is written in the register file 117 (or memory in the case of store instruction) based on a comparison result input from a comparator 120 (D14). The program execution results must be written in the register file 117 or memory in accordance with the execution sequence of the program. This is because, when writing a value into memory in the same address, results change depending on the order in which written. This is also because, even if the final result is the same, intermediate results conforming to the program execution order become necessary when an exception occurs.

A load value prediction unit (LPU) 116 predicts the value to be loaded by a load instruction, and transmits the predicted value (D12) to a value prediction buffer 119 and register file 117. There are various algorithms suggested for the load value prediction algorithm, however, since the present invention does not suppose a specific load value prediction algorithm, and may be applied regardless of the load value prediction algorithm, specific mentioned is not made herein. To give an example of a load value prediction algorithm, there is a method where a value that has been loaded in conformity with a load instruction is stored in the address (program counter value) of that load instruction, and then, when the next load instruction is fetched, the value previously loaded and stored is used as a prediction value.

A value prediction buffer (VPB) 119 is a buffer that stores a load prediction value input from the load value prediction unit 116. The predicted value stored in this value prediction buffer 119 is used for comparison by a comparator 120 with a value (D13) actually loaded later through load instruction execution.

The comparator 120 compares a load prediction value predicted by the load value prediction unit 116 with a value actually loaded by the load instruction.

Next, operations of instruction execution and load value prediction in the processor in FIG. 1 are described.

(1) Operation When Load Value Prediction is not Performed

1. The instruction fetch unit 111 fetches an instruction from the main memory 121 in conformity with the program counter 111b.

2. The fetched instruction is temporarily held in the instruction window buffer 112.

3. The instruction window buffer 112 issues an issuable instruction to an execution unit 114a, 114b, or load/store unit 113 appropriate for executing the instruction.

4. The register file 117 issues the operands necessary for instruction execution to the load/store unit 113 or execution unit 114a or 114b.

5. The load/store unit 113, or execution unit 114a or 114b executes instruction. In other words, when the instruction is a load instruction, the load/store unit 113 loads data from the main memory 121. When the instruction is store instruction, the load/store unit 113 prepares for writing data in the main memory 121. In the case of other instructions, the execution units 114a and 114b execute calculation.

6. The commit unit 118 controls the timing of writing in the register file 117 or main memory 121. In other words, when the instruction is a load instruction, the loaded data is written in a register of the register file 117. When the instruction is a store instruction, data is written in the main memory 12. When the instruction is a branch instruction, the program counter 111b in the instruction fetch unit 111 is updated in conformity with the result of the branch instruction. In the case of other instructions, the operation result is written in the register of the register file 117.

It is assumed herein that each processing 1 through 6 mentioned above is executed for every processor cycle. Generally, there are many pipelined processors having pipelined structure that execute processing for every cycle.

(2) Operation When Load Value Prediction is Performed

1. The instruction fetch unit 111 fetches instruction from the main memory 121 in conformity with the program counter 111b.

2. The load value prediction unit 116 determines whether or not the fetched instruction is a load instruction that is a subject to prediction. If the fetched instruction is a load instruction that is the subject to prediction, a load prediction value is written in the register in which the result of the load instruction is to be written.

3. The fetched instruction is temporarily held in the instruction window buffer 112.

4. The instruction window buffer 112 issues a load instruction to the load/store unit 113.

5. The register file 117 supplies operands required for load instruction execution to the load/store unit 113.

6. The instruction window buffer 112 issues an instruction subsequent to the load instruction.

7. The comparator 120 compares the loaded value obtained through the load instruction execution with the predicted value after the results of the load instruction are obtained.

8. When a prediction verification result is obtained from the comparator 120:

In the case where the prediction is correct, the load instruction and subsequent instruction that was speculatively executed become committable. The commit unit 118 writes the execution results of such instructions in the register or main memory 121 and commits (completes) the instructions with the appropriate timing.

Meanwhile, in the case where the prediction is incorrect, a load value is written in the register in which the execution result of the load instruction is to be written and the load instruction is committed (completed). However, all subsequent instructions are disabled and these instructions are fetched and executed again.

It should be noted that the above-mentioned processing that disables an instruction and starts over beginning with fetching an instruction is referred to as a "flush". In addition, processing that becomes necessary when prediction is incorrect is referred to as "recovery".

FIG. 2 is a flowchart illustrating recovery processing that becomes necessary when this load value prediction is incorrect.

Here, it is assumed that the group of instructions in FIG. 3 is given as specific instruction sequence. It should be noted that S1, S2, S3, and S10 in FIG. 3 indicate respective register names (register numbers).

To begin with, the instruction fetch unit 111 fetches instructions in the order of lw (load word), addi, and add instructions (step S21), and the instruction window buffer 112 holds instructions in the same order. Here, in the case where the fetched lw instruction is a target for prediction (step S22Y), the load value prediction unit 116 writes the load prediction value in the register S1 (register in the register file 117 corresponding to the S1 in the instruction) (step S23).

The instruction window buffer 112 determines whether the instruction is issuable. Here, issuable means the status where the necessary operand is available, and an execution unit of destination to which instruction is to be issued is available or other instructions are not using the execution unit. It should be noted that the instruction window buffer 112 herein is regarded as employing the in-order issuance mechanism. This in-order issuance means that instruction is issued in the fetched order. Accordingly, when the first fetched instruction of instructions held in the instruction window buffer 112 becomes issuable, the instruction window buffer 112 herein issues that instruction. The issued instruction is removed from the instruction window buffer 112. This first fetched instruction of the instructions in the instruction window buffer 112 is given as that which is to be controlled to be always located at the head of the instruction window buffer 112.

In the example of FIG. 3, if a lw instruction is located at the head of the instruction window buffer 112, a value in the register S10 is available, and the load/store unit 113 is available, then the lw instruction is issued to the load/store unit 113 (step S24). The load/store unit 113 loads the value to be loaded from the main memory 121.

While the load/store unit 113 is executing the load instruction, an addi instruction, which is an instruction subsequent to the load instruction, is issued to the execution unit 114a or 114b. This is because it is not necessary to wait for the load instruction execution results since this addi instruction may use the load prediction value as a value of the register S1. Similarly, further subsequent add instruction is issued to the execution unit 114a or 114b. It should be noted that if load value prediction is not performed, subsequent addi instruction and add instruction are not issued to the execution unit 114a or 114b from the instruction window buffer 112 until the lw instruction execution results are obtained.

When the load/store unit 113 obtains the load value that is the load instruction execution result (step S25Y), the comparator 120 compares the previously predicted load value held in the value prediction buffer 119 with the load value that is the actual load instruction execution result, and notifies the commit unit 118 of the comparison result (step S27).

When the two match, that is, when load value prediction is correct (step S27Y), the load instruction is committed (completed) (step S28), the subsequent addi instruction and add instructions are committed (completed) as the respective operation results are obtained (step S29), and the operation results are written in the register files S2 and S3.

Meanwhile, when the two do not match or when load value prediction is incorrect (step S27N), the value loaded through actual load instruction execution is overwritten in the register corresponding to S1 in the register file 117, the load instruction is committed (step S30), and the addi instruction and add instruction subsequent to the load instruction are disabled (step S31). The instruction fetch unit 111 again starts a fetch from an addi instruction (step S32).

Mikko H. Lipasti, et al., "Exceeding the Dataflow Limit via Value Prediction" (IEEE, 1072-4451/96, 1996, p. 226-237) is incorporated herein by reference.

However, conventional instruction prediction for, for example, the load value and the like, has the following problems that need to be solved.

Firstly, hardware costs increase because of controls for prediction verification and prediction error recovery operation. In other words, during load value prediction, whether the predicted value is correct is verified after the value actually loaded through load instruction execution is obtained. If the value prediction is incorrect, it is necessary to re-execute, using the correct values, subsequent instructions that have been speculatively executed. Specialized hardware, such as the value prediction buffer 119 and comparator 120 shown in FIG. 1, becomes necessary for this recovery operation.

If an in-order issuing processor such as that described in FIG. 1 and FIG. 2 is used, since the order in which the load value prediction unit 116 predicts the load instruction value matches the order with which the load/store unit 113 executes the load instruction, it is sufficient for the value prediction buffer 119 to be a buffer having a first-in first-out (FIFO) configuration. Nevertheless, with an out-of-order issuing processor, since the order in which the load value prediction unit 116 predicts the load instruction value is different from the order with which the load/store unit 113 executes load instruction, there is no option but to use hardware having a more complicated configuration, for example, a content-addressable memory (CAM) configuration as this value prediction buffer.

Secondly, in order to implement prediction verification and recovery operation for a prediction error, items requiring specialized control become necessary, including for example, determination of whether or not a prediction error has occurred, or which instruction must be re-executed first when a prediction error has occurred. As the items requiring specialized control increase, the control unit becomes more complicated, and mounting of this control unit and verification operation becomes more difficult. In particular, since recovery processing affects many function blocks, it has a strong tendency to become the critical path during design, and if the control unit that performs recovery processing is complicated, it alone becomes an obstacle to satisfying the timing restrictions of the processor.

SUMMARY OF THE INVENTION

According to an aspect of the present invention, there is provided a control device for speculative instruction execution, comprising: an instruction fetch unit configured to fetch an instruction to be executed by a processor; a value prediction unit configured to predict a value obtained as an execution result of a target instruction for prediction in the case where instruction fetched by the instruction fetch unit is the target instruction for prediction; a branch instruction insertion unit configured to dynamically insert, based on a signal transmitted from the value prediction unit, a branch instruction subsequent to the target instruction for prediction in a group of instructions comprising a target instruction for prediction for which a value is predicted by the value prediction unit and an instruction subsequent to the target instruction for prediction; an instruction issuing unit configured to hold a fetched instruction and speculatively issue an instruction subsequent to the target instruction for prediction to an execution unit without waiting for an execution result for the target instruction for prediction using the value predicted by the value prediction unit; an execution unit configured to execute an instruction issued from the instruction issuing unit; a branch prediction control unit configured to prediet a branch destination for a branch instruction and perform verification of a branch prediction; and a commit unit configured to commit each instruction in a group of instructions executed by the execution unit, and invalidate and re-execute a speculatively executed instruction when the predicted value and execution result do not match; wherein the branch prediction control unit verifies a value prediction by comparing the predicted value predicted by the value prediction unit and the execution result of the target instruction for prediction executed by the execution unit upon execution of the inserted branch instruction, and transmits to the commit unit a signal that indicates that a predicted value and execution result do not match when the predicted value and the execution result do not match.

According to another aspect of the present invention, there is provided a method for controlling speculative instruction execution, comprising: fetching an instruction to be executed by a processor; predicting a value to be obtained as an execution result of the instruction using a value prediction unit when the fetched instruction is a target instruction for prediction; dynamically inserting, based on a signal transmitted from the value prediction unit, a branch instruction subsequent to the target instruction for prediction into a group of instructions comprising the target instruction for prediction for which a value is predicted by the value prediction unit and an instruction subsequent to the target instruction for prediction; holding fetched instructions and speculatively issuing an instruction subsequent to the target instruction for prediction to an execution unit without waiting for the execution result of the target instruction for prediction using the value predicted by the value prediction unit; executing instructions issued from the instruction issuing unit; verifying value prediction by comparing the predicted value predicted by the value prediction unit with the execution result of the target instruction for prediction executed by the execution unit upon execution of the inserted branch instruction; and committing each instruction in a group of instructions executed by the execution unit, and invalidating and re-executing speculatively executed instructions when the predicted value and execution result do not match.

BRIEF DESCRIPTION OF THE DRAWINGS

FIG. 3 is a diagram illustrating an example of instruction sequence for describing recovery processing in FIG. 2;

FIG. 10 is a diagram illustrating the instruction sequence obtained through execution of register renaming processing and branch instruction insertion processing according to the first embodiment, which corresponds to the instruction sequence shown in FIG. 3;

FIG. 11 is a diagram illustrating the instruction sequence obtained through execution of register renaming processing and branch instruction insertion processing according to a second embodiment, which corresponds to the instruction sequence shown in FIG. 3;

FIG. 12 is a diagram illustrating the instruction sequence obtained through execution of register renaming processing and branch instruction insertion processing according to a fourth embodiment which corresponds to the instruction sequence shown in FIG. 3;

FIG. 13 is a diagram illustrating an example of instruction sequence for describing processing in a fifth embodiment;

FIG. 14 is a diagram illustrating the instruction sequence obtained through execution of register renaming processing and branch instruction insertion processing according to a fifth embodiment which corresponds to the instruction sequence shown in FIG. 13;

DETAILED DESCRIPTION OF THE INVENTION

A speculative instruction execution control device and a method for the same according to embodiments of the present invention is described forthwith in detail while referencing FIG. 4 through FIG. 18.

First Embodiment

A first embodiment uses an existing register renaming unit (to be described later) and branch prediction unit realizes a control unit for prediction verification in speculative instruction execution and a flush and recovery when a prediction error occurs. It should be noted that in the first embodiment, a processor capable of out-of-order instruction issuing, and configured with a register renaming unit; a branch prediction unit; and a load instruction value prediction unit, is described as an example, however, the first embodiment is not limited to this configuration.

Figure 4:
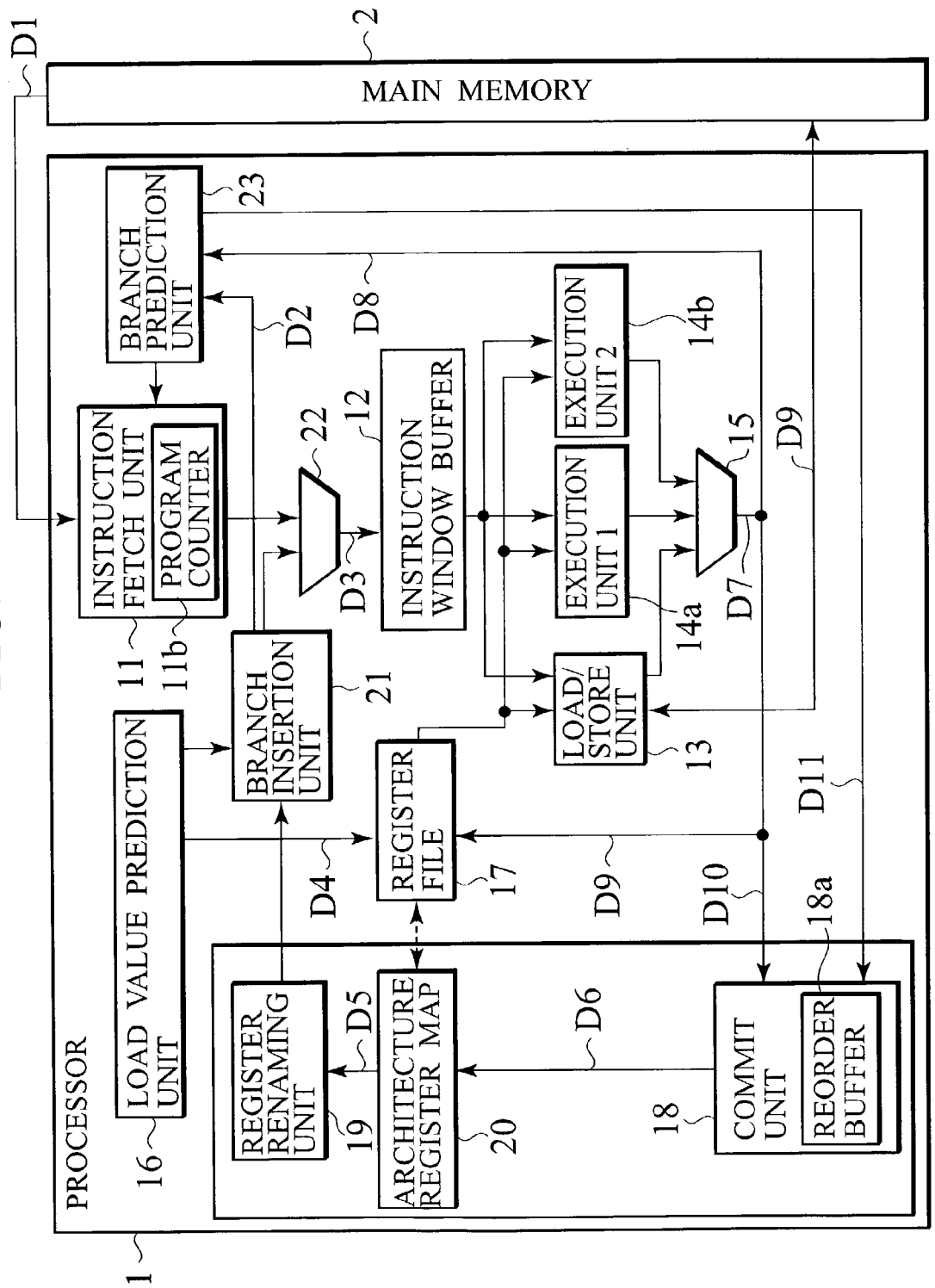
FIG. 4 is a block diagram illustrating an exemplary configuration of a processor having a speculative instruction execution control unit according to a first embodiment of the present invention.

FIG. 4 illustrates an exemplary configuration of a processor having a speculative instruction execution control unit according to the first embodiment of the present invention.

As shown in FIG. 4, a processor having a speculative instruction execution control unit according to the first embodiment, is configured with an instruction fetch unit 11, a program counter 11b, an instruction window buffer 12, a load/store unit 13, execution units 14a and 14b, a load value prediction unit 16, a register file 17, a commit unit 18, a reorder buffer 18a, a register renaming unit 19, an architecture register map 20, a branch insertion unit 21, and a branch prediction unit 23.

A main memory 2 is a memory located external to the processor 1, and stores instructions (programs) and data.

The instruction fetch unit (IFU) 11 includes a program counter (PC) 11b, and fetches instruction (D1) (instruction fetch) to the processor 1 from an address in main memory 2 specified by a value of the program counter 11b. The fetched instruction is temporarily held in the instruction window buffer (IWB) 12.

The instruction window buffer 12 may hold a plurality of instructions. The instruction window buffer 12 issues an instruction to the appropriate load/store unit 13, or the execution unit 14a or 14b. In the first embodiment, this instruction window buffer 12 has an out-of-order issuance configuration where an instruction is dynamically scheduled and issued, however, it is not limited to this configuration. An instruction issuance mechanism carried out by the instruction window buffer 12 in the first embodiment is similar to the conventional in-order issuing instruction window buffer except in that an instruction is issued in an order different from the fetched order when the instruction becomes issuable.

Out-of-order issuance is a method for issuing reordered (scheduled) instruction to the execution unit by reordering the instruction execution order so that final completion of the execution becomes faster when the final result is the same even in the case where the instruction execution order is different from the order in the program (fetched order). For example, if an instruction at the head of the instruction window buffer 12 is not issuable but a subsequently fetched instruction is issuable, and the two instructions have no dependency, the out-of-order instruction window buffer 12 issues this issuable instruction first.

The load/store unit (LSU) 13 and execution units (EX) 14a and 14b are units that respectively execute calculations. There are many variations in the types and numbers of these execution units (execution blocks) depending on the processor, and the execution units are naturally not limited to those shown in FIG. 4. In the first embodiment, arbitrary execution blocks other than the load/store unit 13 relevant to the load instruction may be used.

The load/store unit 13 executes load instruction and store instruction, and transfers data among the processor 1 and main memory 2. The execution units 14a and 14b perform operations other than load instruction and store instruction. For example, integer operation, logical operation, floating point operation, and branch condition determination are performed, but they are not limited to these operations.

The register file (RF) 17 is a physical group of registers referenced from the processor. The register file 17 transmits necessary operands (operation values) to the load/store unit 13, and execution units 14a and 14b respectively, and writes the operation results by those units in the internal register.

The commit unit (CMT) 18 controls the timing of when the operation results are written in the register (or memory in the case of a store instruction) (D6). The program execution results must be written in the register or memory in conformity with the execution order of the program. This is because, when writing a value into the same address in memory, results change depending on the order in which they are written. This is also because, even if the final result is the same, the intermediate results conforming to the program execution order become necessary when an exception occurs.

A load value prediction unit (LPU) 16 predicts the value to be loaded with a load instruction, and transmits this predicted value (D4) to the register file 17. There are various algorithms suggested for this load value prediction algorithm, however, since this embodiment does not assume a specific load value prediction algorithm, and may be applied regardless of the load value prediction algorithm, specific mention is not made herein. To give an example of a load value prediction algorithm, there is a method where a value that has been loaded in conformity with a load instruction is stored in the address (program counter value) of that load instruction, and then, when the next load instruction is fetched, the value previously loaded and stored is used as the prediction value.

The reorder buffer 18a reorders instructions executed out of order into the fetched order, namely "in order", and performs control for terminating the instructions in the "in order" sequence. This reorder buffer 18a administers a group of instructions that are issued from the instruction window buffer 12 but not yet committed (completed), and reorders such instructions.

The register renaming unit 19 performs register renaming (to be described later).

The architecture register map 20 is a table of correspondence between physical registers and architecture registers to which software may refer.

In conjunction with the load value prediction unit 16, the branch insertion unit (BIU) 21 inserts a branch instruction in the instruction window buffer 12 immediately after the load instruction for which a load value is to be predicted.

The branch prediction unit (BPU) 23 executes the branch prediction, verification of this branch prediction, and processing (branch error recovery) when the branch prediction is incorrect (prediction error).

Next, register renaming in the first embodiment is described.

Register renaming is a method for improving parallelism of instruction execution. A processor having this register renaming unit includes more physical registers than the architecture registers to which software may refer. The register renaming unit 19 in FIG. 4 maps the architecture registers to the physical registers (mapping). This mapped status is stored in the architecture register map 20.

The register renaming unit 19 contrives register mapping to hold the intermediate operation results in the proper register and reduce hazards contributed to the register number. In addition, with a processor performing speculative instruction execution, a speculatively executed result, or a result which has the possibility of being an incorrect value, is written in a physical register to which software cannot refer, and maps the physical register in which the result has been written in the architecture register to which software may refer when the speculative execution result is determined as being correct. Through this mapping, if the software accesses the architecture register, the physical register mapped to the architecture register is accessed.

The software (program) refers to only correct results of committed (completed) instruction. Accordingly, not only the register renaming unit 19 that performs mapping of registers, but also the commit unit 18 that controls instruction completion is involved in implementation of the register renaming function. Furthermore, with an out-of-order executing processor, the reorder buffer 18a that administers the order for committing (completing) instruction is also involved.

Figures 5, 6, 7:
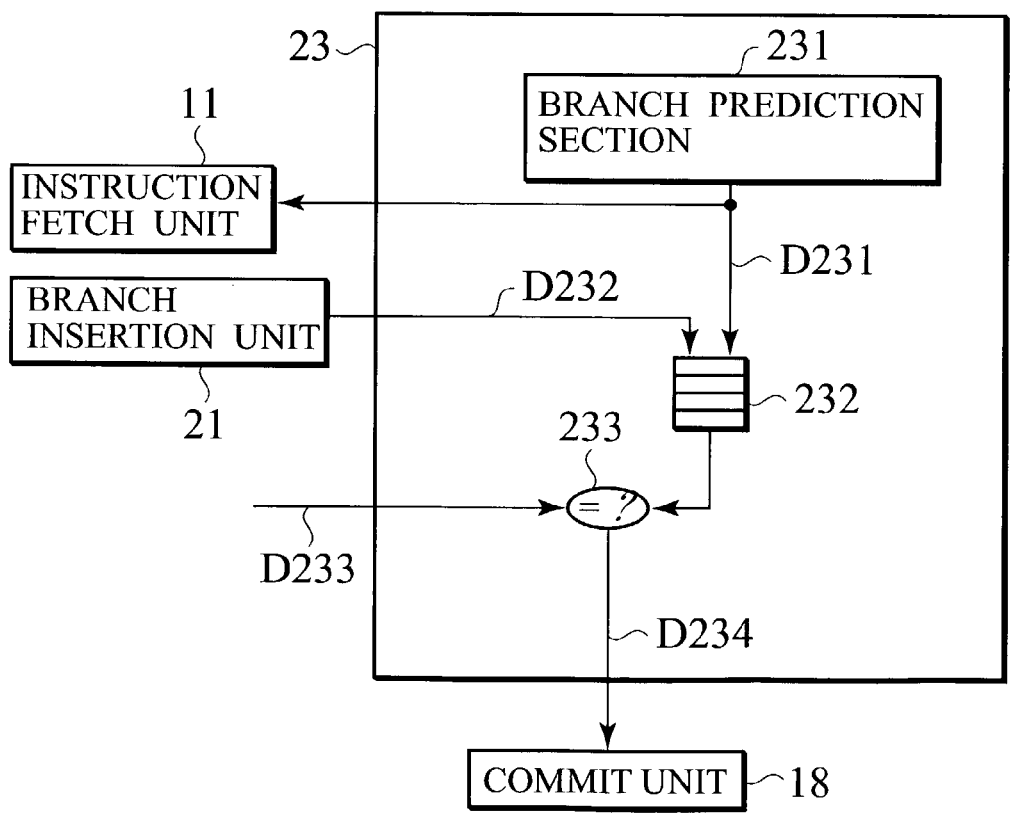
FIG. 5 is a diagram illustrating an example of instruction sequence for describing operation of a register renaming unit in the first embodiment.
FIG. 6 is a diagram illustrating instruction sequence which is the instruction sequence shown in FIG. 5 renamed by using the register renaming unit in the first embodiment.
FIG. 7 is a block diagram illustrating the internal configuration of the branch prediction unit 23 shown in FIG. 4.

Register renaming is more specifically described with the exemplary instruction sequence shown in FIG. 5.

In FIG. 5, S1, S2, S3, S4, S10 and S11 are respective architecture registers.

In FIG. 5, since a lw instruction (load word instruction) in the fourth line and an addi instruction in the fifth line use the same register S1 as the lw instruction, addi instruction, and add instruction in the first line through the third line, it is not possible to execute the lw instruction in the fourth line until instructions from the first line through third line are completed. However, since the register S1 is only used for holding the intermediate value of instructions from the first line through the third line, it is possible to substitute the register S1 with another register if another register is available. In other words, instructions in the fourth line and fifth line essentially have no dependency on instructions in the first line through third line.

FIG. 6 illustrates instruction sequence that are the instruction sequence shown in FIG. 5 renamed using the register renaming unit of the first embodiment. With the instruction sequence renamed by the register renaming unit and shown in FIG. 6, instructions subsequent to the fourth line may be issued without waiting for completion of instructions in the first line through third line.

In FIG. 6, R1, R2, R3, R4, R10, R11 and R40 are respective physical registers. With the instruction sequence of FIG. 6, the S1 register for instructions in the first line through the third line in FIG. 5 is renamed the R40 register; and the S1 register for instructions in the fourth line and fifth line in FIG. 5 is renamed the R1 register. This causes the dependency between the instructions in the first line through third line and the instructions in the fourth line and fifth line to be severed. If the S1, S2, S3, S4, S10, and S11 registers are mapped to the R1, R2, R3, R4, R10, and R11 registers, respectively, upon completion of instructions in the first line through the fifth line in FIG. 6, the software is allowed to reference the correct value.

Next, configuration and operation of a branch prediction unit 23 of the first embodiment is described.

FIG. 7 is a block diagram illustrating the internal configuration of the branch prediction unit 23 shown in FIG. 4.

As shown in FIG. 7, the branch prediction unit 23 according to the first embodiment is configured with a branch prediction section 231, branch prediction buffer 232, and comparator 233.

The branch prediction unit 23 includes a section for predicting a branch and a section for verifying the branch prediction result.

The branch prediction section 231 corresponds to the section for actually predicting a branch. Since the first embodiment may be applied regardless of the branch prediction algorithm, and the specifics of the branch algorithm do not directly relate to this embodiment, specific mention is not made in this specification.

Figure 8:
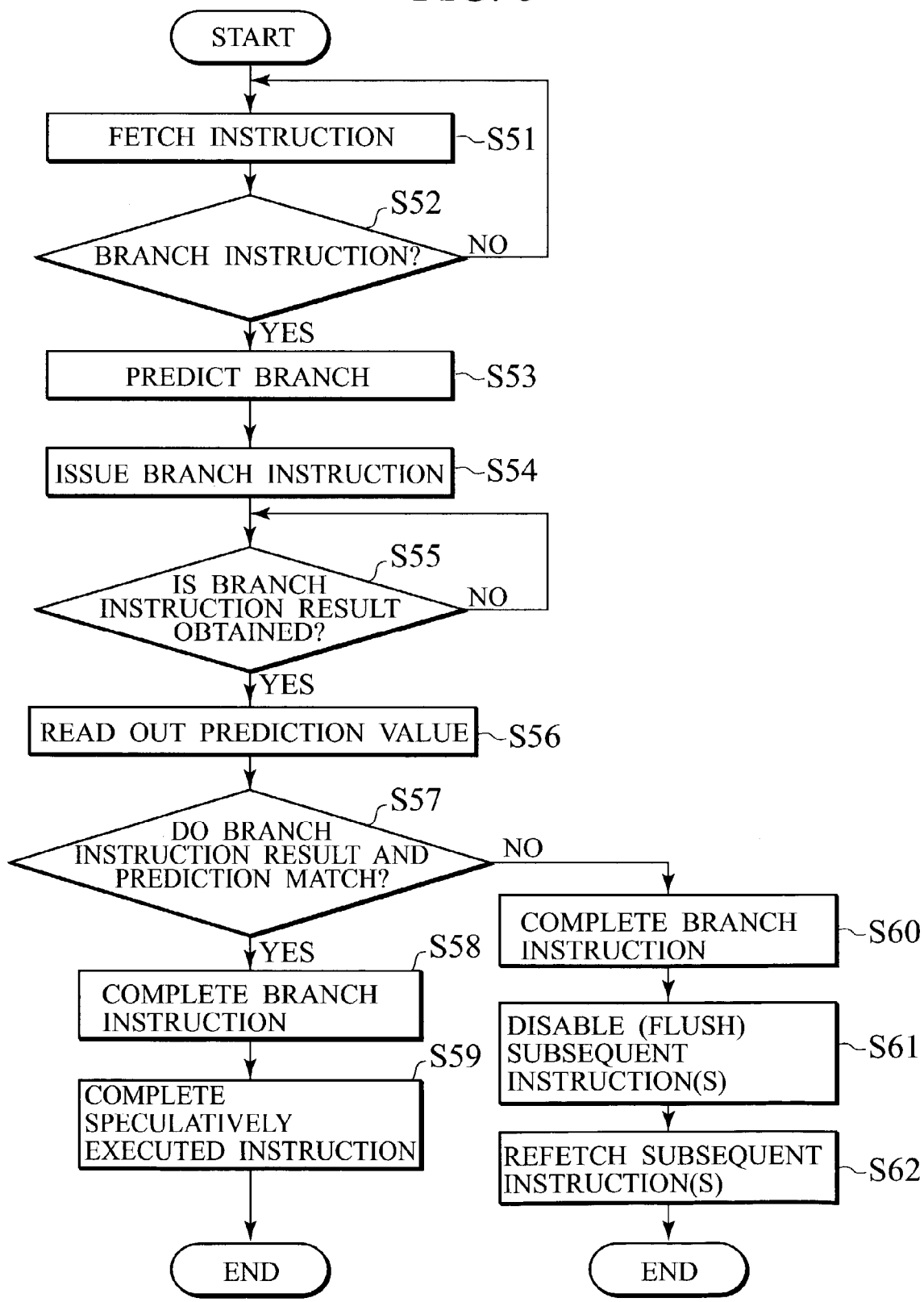
FIG. 8 is a flowchart illustrating an example of branch prediction control in the branch prediction unit 23 in FIG. 7.

FIG. 8 is a flowchart illustrating an example of branch prediction control in the branch prediction unit 23 in FIG. 7.

To begin with, the instruction fetch unit 11 fetches instruction based on the program counter 11b (step S51). If the fetched instruction is a branch instruction (step S52Y), then branch prediction is performed (step S53); whereas, if it is not a branch instruction (step S52N), then processing returns to step S51.

A branch prediction algorithm used by the branch prediction section 231 may include, for example, a branch target buffer (BTB). This BTB, is a cache having the program counter (PC) of a branch instruction as a tag, and stores the PC of the branch destination (branch target) and the history of that branch instruction in the cache thereof. When the program counter for the fetched branch instruction hits that of the BTB, the history in the BTB entry hit is referenced. Whether or not the branch of branch instruction has been taken or not taken is determined from the referenced history. If taken, then the target instruction in the entry hit is subsequently fetched. In the case where it is not taken, the instruction is fetched from the program counter in an address immediately following to the branch instruction.

A branch prediction buffer 232 and comparator 233 correspond to the section for verifying branch prediction.

The branch prediction buffer 232 temporarily holds results predicted by the branch prediction section 231. When a branch instruction is issued (step S54) and the actually calculated result of the branch instruction is obtained (step S55Y), the branch prediction value held in the branch prediction buffer is read out (step S56). The comparator 233 compares the actual branch result (D233) and predicted result (step S57). The commit unit 18 is notified of this comparison result (D234).

When the predicted branch result is correct (step S57Y), the commit unit 18 commits (completes) the branch instruction (step S58), and commits, in the normal manner, instructions subsequent to this branch instruction including speculatively executed instructions (step S59).

Meanwhile, if the predicted branch result is incorrect (step S57N), the branch instruction is committed (step S60), however, all instructions subsequent to this branch instruction are disabled (flushed) (step S61). The original correct instruction address (i.e., a target address when the branch is taken; or an address of instruction subsequent to that branch instruction when the branch is not taken) is set to the program counter 11b in the instruction fetch unit 11, and instruction fetch is resumed from that point (step S62).

In the first embodiment, the hardware inserts into the instruction window buffer 12 the branch instruction subsequent to the load instruction for which a load value is to be predicted. Corresponding to this, as shown in FIG. 7, information on the virtual branch instruction inserted from the branch insertion unit 21 is added into the branch prediction buffer 232. More specifically, information saying that the branch has been predicted as being not taken is always written in this virtual branch instruction.

This virtual branch instruction, which is automatically inserted by the hardware when load instruction whose load value is to be predicted is fetched, is a branch instruction for subsequently "determining whether or not the load value prediction is correct, and re-executing speculatively executed instructions, if incorrect".

Next, operation of a load value prediction control unit in the first embodiment is described. Operation of the processor 1 after a load instruction is fetched is described in the following using a time series.

Figure 9:
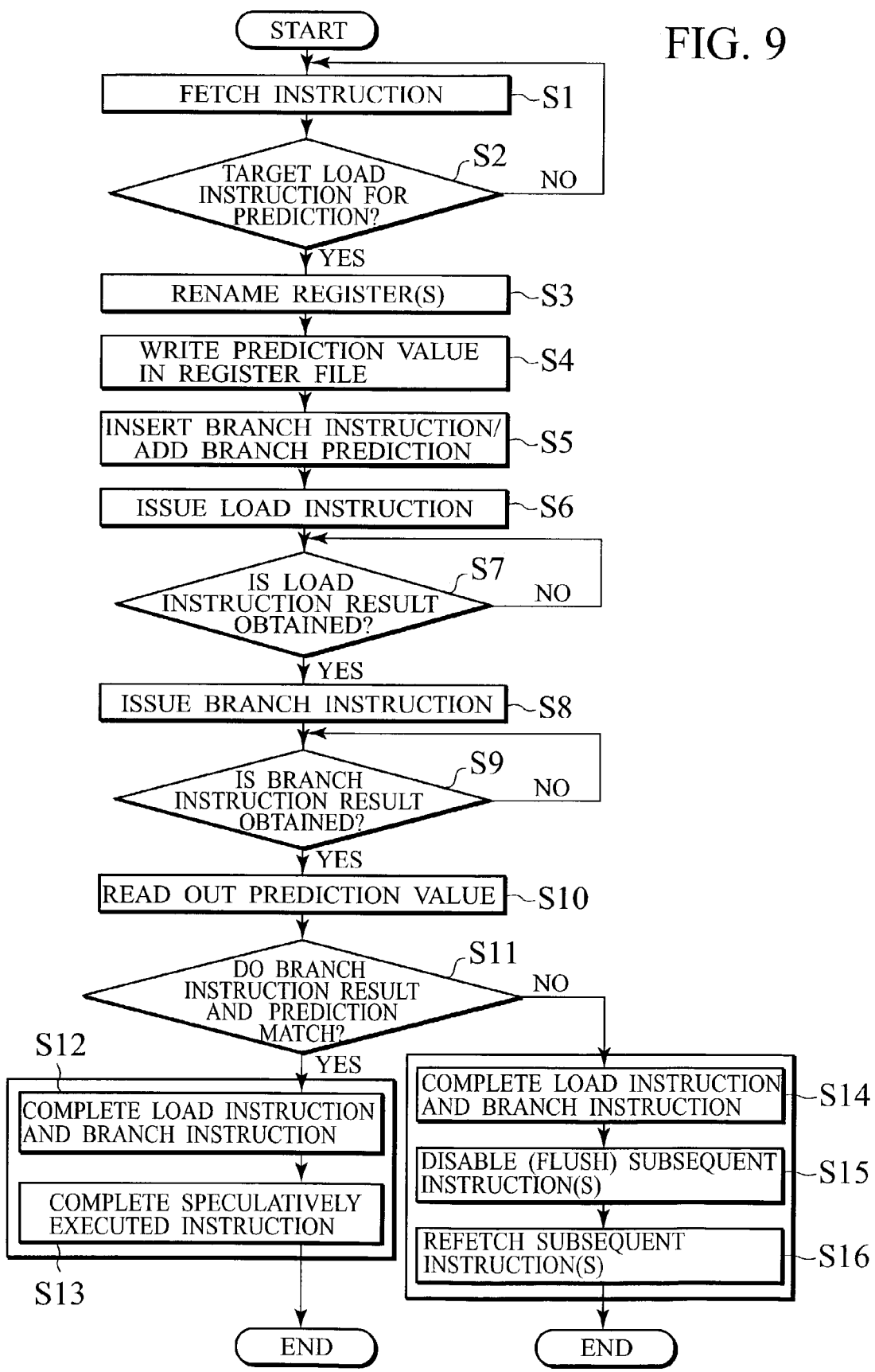
FIG. 9 is a flowchart for describing a series of operations after an instruction is fetched, including load value prediction, speculative instruction execution, prediction verification, and recovery when a prediction error occurs in the first embodiment.

FIG. 9 is a flowchart describing a series of operations after an instruction is fetched, including load value prediction, speculative instruction execution, prediction verification, and recovery when a prediction error occurs in the first embodiment.

To begin with, as shown in FIG. 9, the instruction fetch unit 11 fetches instruction (step S1). Here, if the fetched instruction is a target for prediction (step S2Y), the register renaming section 19 executes register renaming (step S3). The load value prediction unit 16 writes the load prediction value in the register file (step S4).

The branch insertion unit 21 inserts a virtual branch instruction into the instruction window buffer 12, and adds an entry to the branch prediction buffer 232 (step S5).

The instruction window buffer 12 issues a load instruction to the load/store unit 13 (step S6). The load/store unit 13 loads the value to be loaded from the main memory 2.

The load/store unit 13 waits for determination of the load value in conformity with load instruction execution (step S7). When the load value of the load instruction execution result is obtained (step S7Y), the instruction window buffer 12 issues the inserted virtual branch instruction to the execution unit 14a or 14b (step S8). The execution unit 14a or 14b waits for determination of the branch instruction execution result (step S9). When the result of the branch instruction is obtained (step S9Y), the branch prediction unit 23 reads out the branch instruction prediction result (step S10), compares the read out branch instruction prediction result and the result obtained in conformity with branch instruction execution (step S11), and notifies the commit unit 18 of the comparison result.

When the two match, that is, when branch prediction is correct (step S11Y), the commit unit 18 commits (completes) the load instruction and branch instruction (step S12), and also commits (completes) subsequent instructions that have been speculatively executed (step S13).

Meanwhile, when the two do not match, that is, when branch prediction is incorrect (step S11N), the commit unit 18 commits the load instruction and branch instruction (step S14) and disables (flushes) instructions subsequent to the load instruction (step S15). The instruction fetch unit 11 again starts the fetch of a subsequent instruction (step S16).

The register renaming and the branch instruction insertion described above are performed as follows.

The physical register in which the predicted load instruction result is written and the physical register in which this predicted value is written are mapped as different registers. Here, the former physical register is given as Rm, and the latter physical register as Rn.

The predicted load instruction is renamed to be an instruction that writes the load result in the register Rm in the instruction window buffer 12. A branch instruction for determining whether the values in the Rm and Rn match is inserted immediately after this load instruction. In addition, subsequent instructions that use the load instruction result are renamed as instructions that use the value in the register Rn as the load value to be used in the instruction window buffer 12.

FIG. 10 illustrates the instruction sequence obtained in conformity with execution of register renaming processing and branch instruction insertion processing which corresponds to the instruction sequence shown in FIG. 3.

In FIG. 10, Rm, Rn, R2, R3, and R10 are respective physical registers. The result of actual load instruction execution is stored in the Rm. The load value predicted by the load value prediction unit 16 is stored in the Rn, and subsequent instructions that use the load instruction execution result are renamed to use the Rn value as the load instruction result. This allows speculative issuance of subsequent instructions without waiting for the execution results of the load instruction and inserted branch instruction by employing an out-of-order issuance mechanism.

Branch instruction (bne instruction) in FIG. 10 is a virtual branch instruction inserted by the branch insertion unit 21. With this branch instruction, the actual load result (Rm) and load prediction value (Rn) are compared, and if the two do not match, processing branches to a label L1. Since this branch instruction has dependency on the immediately preceding load instruction result (Rm), the branch instruction is issued after this load instruction result becomes available by employing the instruction issuance mechanism of the instruction window buffer 12. In other words, steps S7 and S8 in FIG. 9 are implemented through the out-of-order instruction issuance mechanism of the instruction window buffer 12.

The branch instruction in FIG. 10 ultimately branches to the same address regardless of whether the branch is taken or not taken. However, the difference between the two lies in the following: when the branch is taken, that is, when load value prediction and the result do not match, subsequent instructions are disabled (flushed) by the same unit as when prediction is not taken in the branch prediction. Otherwise, when the branch is not taken, that is, when load value prediction and the result match, subsequent instructions that have been speculatively executed are committed since branch prediction matches.

In order to re-execute subsequent instructions, the instructions that use the load instruction result should be renamed using Rm since the load instruction result has already been obtained in the register Rm.

It should be noted that each of out-of-order issuance (dynamic scheduling), register renaming, and branch prediction used in the first embodiment is a method generally used as a method for increasing the speed of the processor independent of load value prediction. Accordingly, in the first embodiment, existing hardware associated with these prediction units, such as the register renaming unit 19, out-of-order instruction window buffer 12, reorder buffer 18a, and branch prediction unit 23, may be used as the instruction prediction unit for, for example, a load value and the like.

In the first embodiment, the newly added branch insertion unit 21 is a simple function unit that only inserts branch instruction in conformity with the register renaming processing by the register renaming unit 19 with timing that is predicted by the load value prediction unit 16. Therefore, in comparison with the case of using the conventional value prediction buffer 119 and comparator 120 described in FIG. 1, hardware costs are drastically reduced.

In addition, in the first embodiment, steps S7 and S8 in FIG. 9 are implemented with the out-of-order issuance mechanism of the normal instruction window buffer 12; and steps S9 through S16 are implemented with the prediction error recovery mechanism provided by the branch prediction unit 23.

Figure 2:
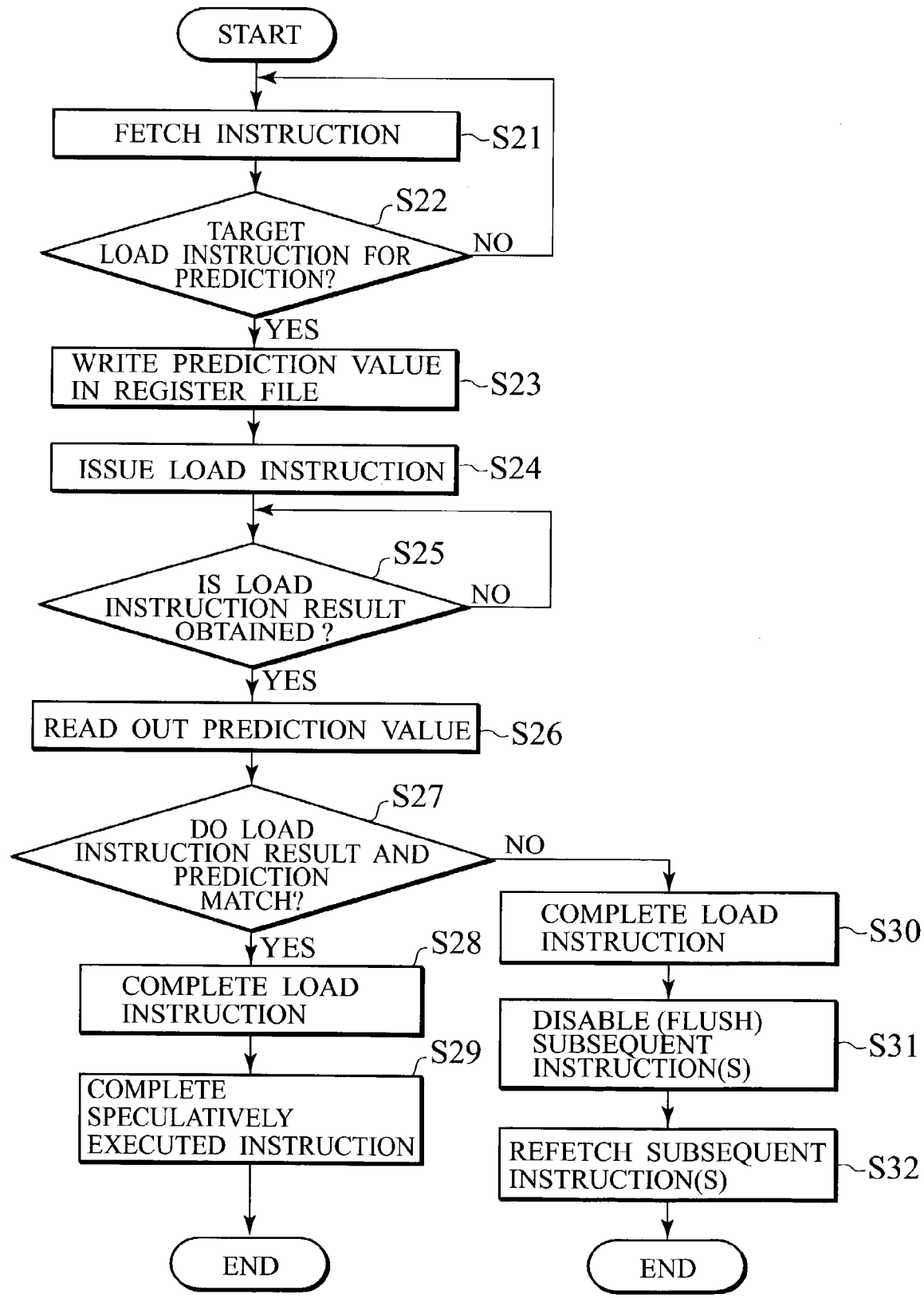
FIG. 2 is a flowchart illustrating recovery processing that becomes necessary when load value prediction is incorrect.

Accordingly, in comparison with the conventional control flowchart described in FIG. 2, this may be considered as equivalent to the case where specific controls subsequent to load instruction issuance in step S24 are omitted, or more specifically, the control mechanism provided by other unit may be seen as implementing the specific controls.

In addition, in comparison with the flowchart prior to load instruction issuance processing in step S24, register renaming processing, branch instruction insertion, and addition of the branch prediction entry (steps S3 and S5) are added in FIG. 9. Since the existing unit independent of load value prediction may be used for this register renaming processing, substantially only branch instruction insertion and addition of the branch prediction entry are added.

Accordingly, with the first embodiment, the recovery processing control for load value prediction may be seen as being simplified.

With the first embodiment, the following effects may be obtained.

In other words, the first embodiment easily realizes the load value prediction control unit using the above-mentioned register renaming mechanism (register renaming unit 19 and architecture register map 20) and branch prediction unit 23. In addition, by using such existing hardware, it is possible to reduce hardware costs for the load value prediction control unit and furthermore, the prediction unit.

Second Embodiment

Next, while referencing FIG. 11, only those points of a speculative computer instruction execution control device and method for the same according to a second embodiment of the present invention that differ from the first embodiment are described.

The second embodiment differs from the first embodiment in that the branch destination of the branch instruction executed by the branch insertion unit 21 in FIG. 4 that is described in the first embodiment is changed to the "address of the predicted load instruction itself" instead of the "address of the instruction immediately after the predicted load instruction".

Since the configuration of a processor having a speculative instruction execution control device according to the second embodiment is similar to the processor of the first embodiment shown in FIG. 4, and branch prediction control processing according to the second embodiment is similar to the case of the first embodiment shown in FIG. 8, respective descriptions thereof are omitted.

FIG. 11 illustrates the instruction sequence obtained in conformity with the execution of register renaming processing and branch instruction insertion processing according to the second embodiment, which corresponds to the instruction sequence shown in FIG. 3.

In FIG. 11, the Rm, Rn, R2, R3 and R10 are respective physical registers. The result of the actual load instruction execution is stored in Rm. The load value predicted by the load value prediction unit 16 is stored in Rn, and subsequent instructions that use the load instruction execution result are renamed to use the Rn value as the load instruction result. By using an out-of-order issuance mechanism, this allows speculative issuance without waiting for the execution results of load instruction and inserted branch instruction.

The branch instruction (bne instruction) in FIG. 11 is a virtual branch instruction inserted by the branch insertion unit 21 according to the first embodiment. With this branch instruction, the actual load result (Rm) and load prediction value (Rn) are compared, and if the two do not match, processing branches to the label L1.

When load value prediction is incorrect (load value prediction error), re-fetching is carried out from the load instruction (lw instruction) without committing (completing) the load instruction (lw instruction) and inserted branch instruction (bne instruction) of FIG. 11.

In the second embodiment, the load instruction during re-execution has the same load instruction already executed immediately beforehand. Accordingly, if a processor has a cache, then the value to be loaded is stored in cache, and it is possible to obtain the correct execution result for the load instruction with little time delay. It should be noted that the branch insertion unit 21 does not insert branch instruction since load value prediction is not performed during re-execution of the load instruction.

Third Embodiment

Next, only those points of a speculative computer instruction execution control device and method for the same according to a third embodiment of the present invention differing from the second embodiment are described.

The third embodiment is different from the second embodiment in that load value prediction processing and branch prediction processing are performed in the re-executing load instruction described in the second embodiment. Accordingly, the branch instruction insertion processing and branch prediction addition processing in steps S3 through S5 in FIG. 9 are also re-executed.

Since the configuration of a processor having a speculative instruction execution control device according to the third embodiment is similar to the processor of the first embodiment shown in FIG. 4, and branch prediction control processing according to the second embodiment is similar to the case of the first embodiment shown in FIG. 8, descriptions thereof are omitted.

It is possible to perform correct prediction using a load value that is a result of the previously executed load instruction as the load prediction value for re-execution when load value prediction is re-executed.

According to the third embodiment, since load value prediction is performed when both executing and re-executing the first load instruction, controls for the respective cases of performing prediction and not performing prediction are simplified.

In addition, since load value prediction processing is also performed when re-executing a load instruction, it is possible to issue subsequent instructions having dependency on a load instruction earlier than in the case of the second embodiment.

Fourth Embodiment

Next, only those points of a speculative computer instruction execution control device and method for the same according to a fourth embodiment of the present invention differing from the first embodiment are described while referencing FIG. 12.

The fourth embodiment is different from the first embodiment in that with the branch instruction insertion performed by the branch insertion unit 21 in FIG. 4 described in the first embodiment, branch instruction is inserted so that where, between the load instruction execution result and the predicted value, "if there is a match, then branch taken is predicted", or "if there is no match, then branch not taken is predicted" is inserted.

The branch insertion unit 21 writes information that "branch taken is predicted" in the prediction entry to be added in the branch prediction buffer 232.

Since the configuration of a processor having a speculative instruction execution control device according to the fourth embodiment is similar to the processor of the first embodiment shown in FIG. 4, and branch prediction control processing according to the fourth embodiment is similar to the case of the first embodiment shown in FIG. 8, descriptions thereof are omitted.

FIG. 12 illustrates the instruction sequence obtained through the execution of register renaming processing and branch instruction insertion processing according to the fourth embodiment, which corresponds to the instruction sequence shown in FIG. 3.

In FIG. 12, the Rm, Rn, R2, R3 and R10 are respective physical registers. The actual executed result of the load instruction is stored in Rm. Since the load value predicted by the load value prediction unit 16 is stored in Rn, and subsequent instructions that use the load instruction execution result are renamed to use the Rn value as the load instruction result, speculative issuance may be performed without waiting for the execution results of the load instruction and inserted branch instruction using the out-of-order issuance mechanism.

With the fourth embodiment, operations similar to the first embodiment may be implemented. In conformity with the branch instruction in FIG. 12, if the predicted load value and the load instruction execution result do not match, the inserted branch instruction is not taken. This is because branch error recovery occurs since this branch instruction not taken is inconsistent with the "branch taken" in branch prediction.

Fifth Embodiment

Next, only those points of a speculative computer instruction execution control device and method for the same according to a fifth embodiment of the present invention differing from the first embodiment are only described while referencing FIG. 13 and FIG. 14.

The fifth embodiment is different from the first embodiment in that with the recovery processing for load value prediction error in steps S14 through S16 of FIG. 9 described in the first embodiment, re-execution starts from the first instruction having dependency on the load instruction for which a load value is predicted.

Since the configuration of a processor having a speculative instruction execution control device according to the fifth embodiment is similar to the processor of the first embodiment shown in FIG. 4, and branch prediction control processing according to the fifth embodiment is similar to the case of the first embodiment shown in FIG. 8, descriptions thereof are omitted.

There are various methods for the recovery operation in load value prediction. A recovery operation is an operation that disables speculatively executed instructions and the results thereof, and re-executes such instructions. With this recovery operation, it is not necessary to actually disable non-speculatively executed instructions (non-speculative instructions). Nevertheless, in order to simplify the operation control, a part or all of the non-speculative instructions may be disabled and re-executed.

Accordingly, there are various variations in recovery operation depending on which instruction is disabled, and from which stage the processor re-executes the disabled instruction. These operation variations have the same effects as far as keeping the calculation result in the correct status, however, the penalties for a prediction error differ. Generally, complicated recovery operation has fewer penalties. In other words, there is a trade-off relationship between complicating the operation and reducing the penalties.

In the first embodiment, "all instructions following the predicted load instruction" are disabled, and re-execution starts from "fetching the instruction" of the disabled instructions. This recovery operation in the first embodiment may be implemented with a relatively simple control. Meanwhile, the fifth embodiment is an embodiment wherein the control for recovery operation is more complicated in order to reduce prediction error penalties.

In other hand, in the fifth embodiment, if a load value prediction is incorrect, only "the first instruction and subsequent instructions having dependency on this load instruction" of the instructions subsequent to the load instruction are disabled, and the instruction fetch is started again from "the first instruction having dependency on this load instruction". Accordingly, if an instruction having no dependency on this load instruction is executed between a load instruction for which load value is predicted and an instruction having dependency on this load instruction, this instruction having no dependency on the load instruction is not disabled.

It is assumed that the group of instructions in FIG. 13 is given as the specific instruction sequence. It should be noted that S1, S2, S3, S4, S5, S6 and S10 in FIG. 13 indicate respective architecture register names (register numbers).

In the group of instructions in FIG. 13, a subtract instruction (sub instruction) has no dependency on a load instruction (lw instruction).

FIG. 14 illustrates the instruction sequence obtained through the execution of register renaming processing and branch instruction insertion processing according to the fifth embodiment, which corresponds to the instruction sequence shown in FIG. 13.

In FIG. 14, the Rm, Rn, R2, R3, R4, R5, R6 and R10 are respective physical registers. The actual execution result of the load instruction is stored in Rm. The load value predicted by the load value prediction unit 16 is stored in Rn, and subsequent instructions that use the load instruction execution result are renamed to use the Rn value as the load instruction result. This allows speculative issuance without waiting for the execution results of the load instruction and inserted branch instruction by using the out-of-order issuance mechanism.

Since the branch destination of the branch instruction shown in FIG. 14 is an immediate add instruction (addi instruction), only the instructions subsequent to the inserted branch instruction are disabled by the recovery operation for a branch prediction error when load value prediction is incorrect (prediction error).

In the fifth embodiment, the branch insertion unit 21 inserts a branch instruction immediately before "the first instruction having dependency on the predicted load instruction".

In the fifth embodiment, a function for detecting this "first instruction having dependency on the predicted load instruction" becomes necessary. Accordingly, the branch insertion unit 21 must be informed by the register renaming section 19 that instruction using the register Rn is fetched in FIG. 14, which makes control performed by the branch insertion unit 21 is somewhat complicated.

Nevertheless, with the fifth embodiment, the number of times the instruction having no dependency on load instruction is re-executed may be reduced, which allows reduction of prediction error penalties.

Sixth Embodiment

Figure 15:
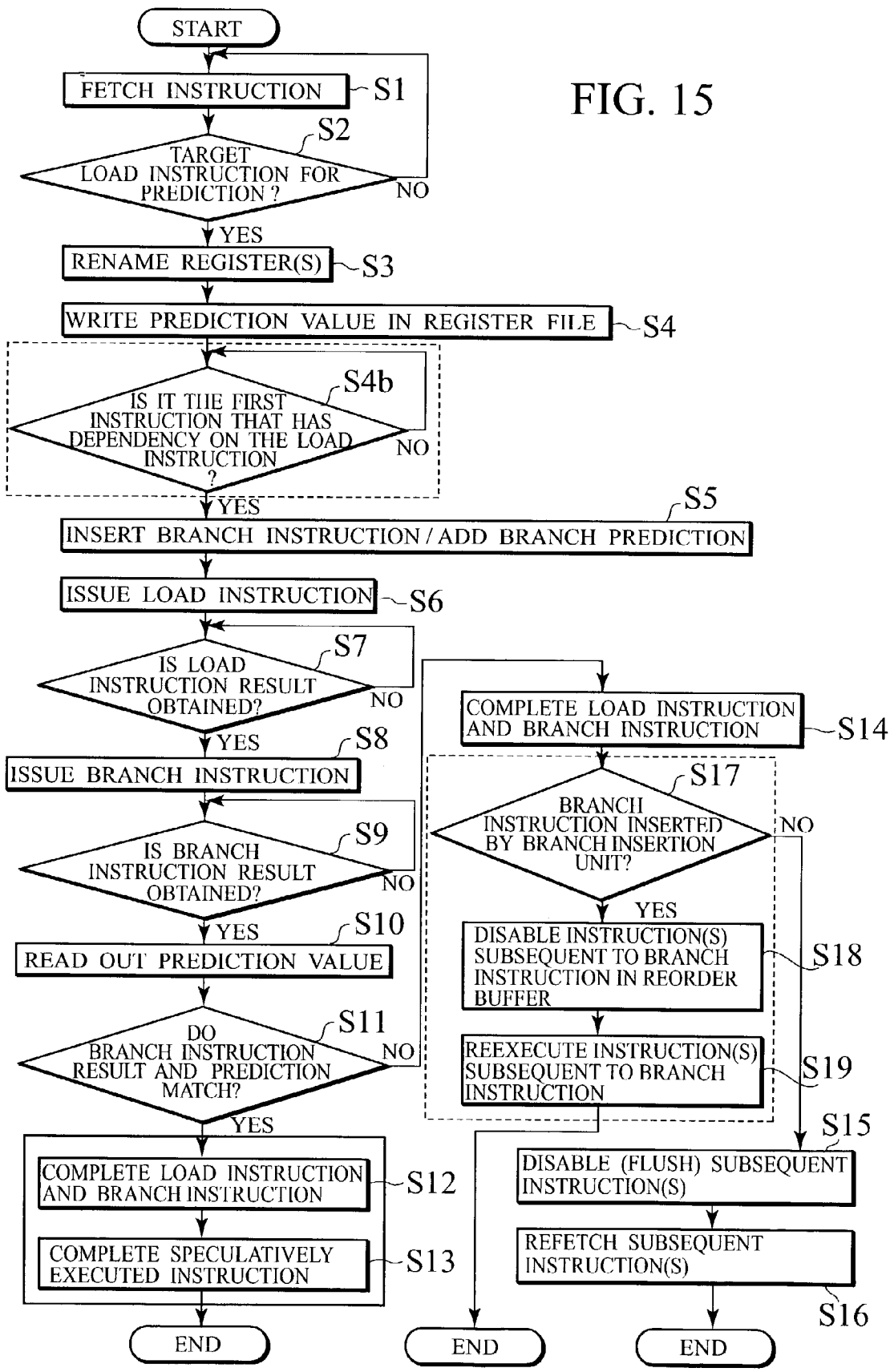
FIG. 15 is a flowchart illustrating recovery operation control when a load value prediction error occurs according to a sixth embodiment.

Next, only those points of a speculative computer instruction execution control device and method for the same according to a sixth embodiment of the present invention differing from the fifth embodiment are described while referencing FIG. 15.

While the fifth embodiment re-executes "instruction fetch" first for the first instruction having dependency on the load value predicted load instruction and instructions subsequent to the first instruction in steps S14 through S16 described in FIG. 9, the sixth embodiment re-executes "instruction issuance" first for the first instruction having dependency on load instruction for which load value is predicted and the instructions subsequent to the first instruction.

In the sixth embodiment, the instruction window buffer 21 holds a issued instruction until the instruction is committed (completed) and it must be made re-issuable in recovery operation for a prediction error. Thus, a unit that implements such functions becomes necessary.

In addition, in the fifth embodiment, the recovery control unit in the branch prediction unit 23 is unified with the recovery control unit for a load value prediction error. Although "instruction fetch" is re-executed first for the conventional branch prediction error, the sixth embodiment re-executes "instruction issuance" first for the virtual branch instruction prediction error, therefore a part of recovery control unit in the branch prediction unit 23 may not be unified (shared-used) for the recovery for the load value prediction error.

FIG. 15 is a flowchart illustrating recovery operation control for a load value prediction error according to the sixth embodiment.

In comparison with the flowchart of the first embodiment shown in FIG. 9, a step for determining which is the first instruction having dependency on load instruction (step S4b) is added in order to determine an insertion point prior to the insertion processing for a branch instruction (step S5) executed by the branch insertion unit 21. (This step S4b also becomes necessary for the above-mentioned fifth embodiment.) In addition, when the branch prediction error occurs, it is determined whether it is either the case where a prediction error has occurred due to a branch instruction that is inserted by the branch insertion unit 21, or the case of a prediction error other than the former case (step S17). In the case of a prediction error of a branch instruction inserted by the branch insertion unit 21 (step S17Y), instructions subsequent to the branch instruction inserted by the branch insertion unit 21 in the reorder buffer 18a are disabled (step S18) and disabled subsequent instructions are re-issued (step S19). The reorder buffer 18a administers an "issued but not committed instruction". Accordingly, instructions to be re-issued are disabled in the reorder buffer 18a, and they are properly re-issued by being made re-issuable in the instruction window buffer 12 at the same time.

Meanwhile, in the case of a prediction error other than that occurring due to a branch instruction that is inserted by the branch insertion unit 21 (step S17N), recovery operation for a branch prediction error as with the above-mentioned embodiments is executed (step S15 and step S16).

With the sixth embodiment, control for a prediction error is more complicated than that with the fifth embodiment, however, prediction error penalties may be reduced further.

Seventh Embodiment

Next, only those points of a speculative computer instruction execution control device and method for the same according to a seventh embodiment of the present invention differing from the sixth embodiment are described.

In the sixth embodiment, instruction issuance is re-executed first for "the first instruction having dependency on the predicted load instruction and instructions subsequent to the first instruction" in steps S18 and S19 described in FIG. 5, whereas, in the seventh embodiment, instruction issuance is re-executed first for "all of the instructions of the issued instructions having dependency on the predicted load instruction".

In the seventh embodiment, instructions that have no dependency on load instruction for which load value is predicted are not re-executed.

A reorder buffer 18a according to the seventh embodiment selects and disables only instructions having dependency on the load instruction of the issued instructions when the load value prediction error occurs. In addition, an instruction window buffer 21 according to the seventh embodiment makes issuable only those instructions having dependency on the load instruction for which load value prediction error has occurred, of the issued instructions, and starts re-issuance of such instructions.

With the seventh embodiment, control for the prediction error becomes more complicated than the sixth embodiment, however, prediction error penalties may be further reduced since only the instructions having dependency on the load instruction are selectively re-executed.

Eighth Embodiment

Figure 16:
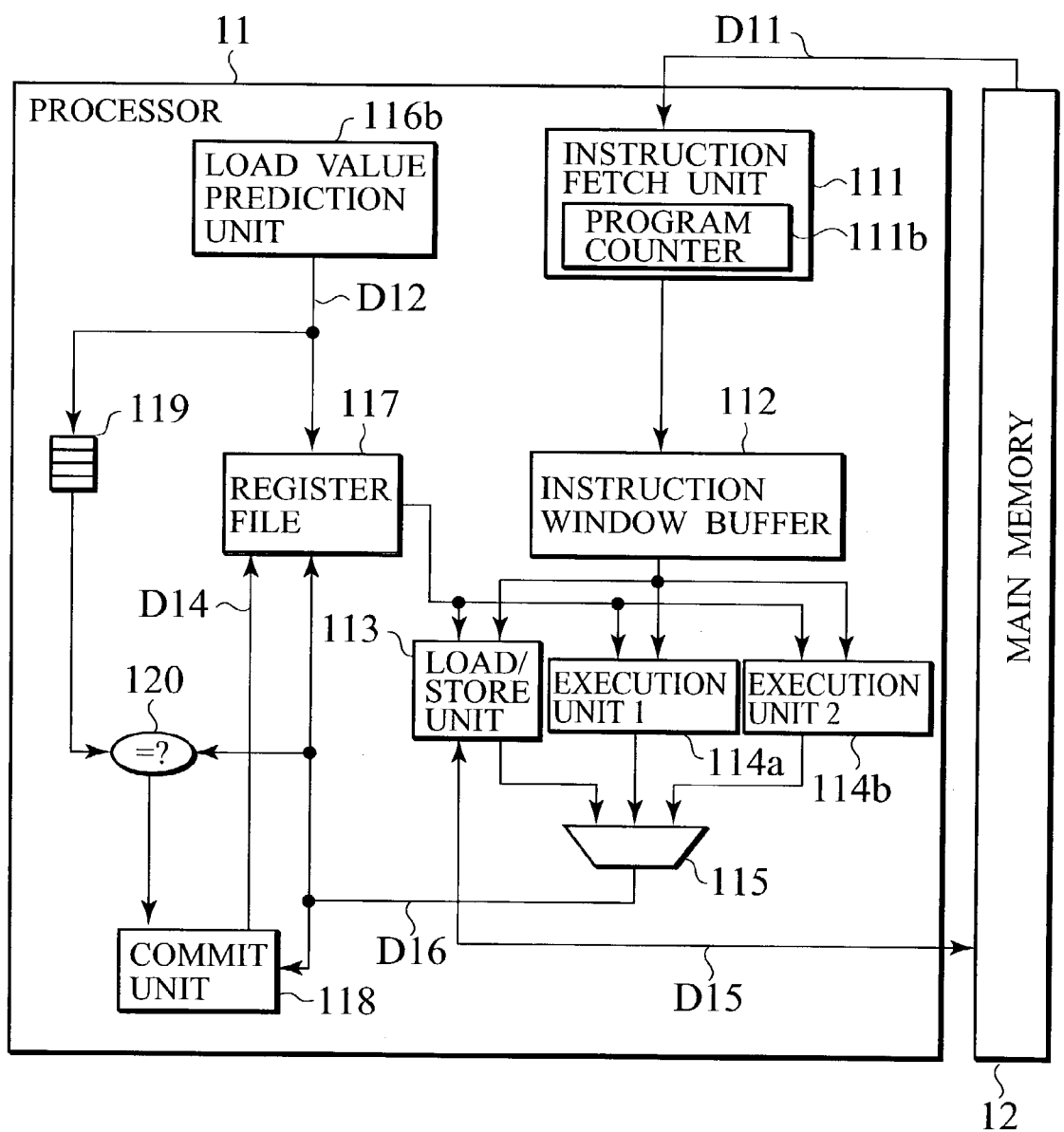
FIG. 16 is a block diagram illustrating an exemplary configuration of a processor having a conventional value prediction unit.
Figure 17:
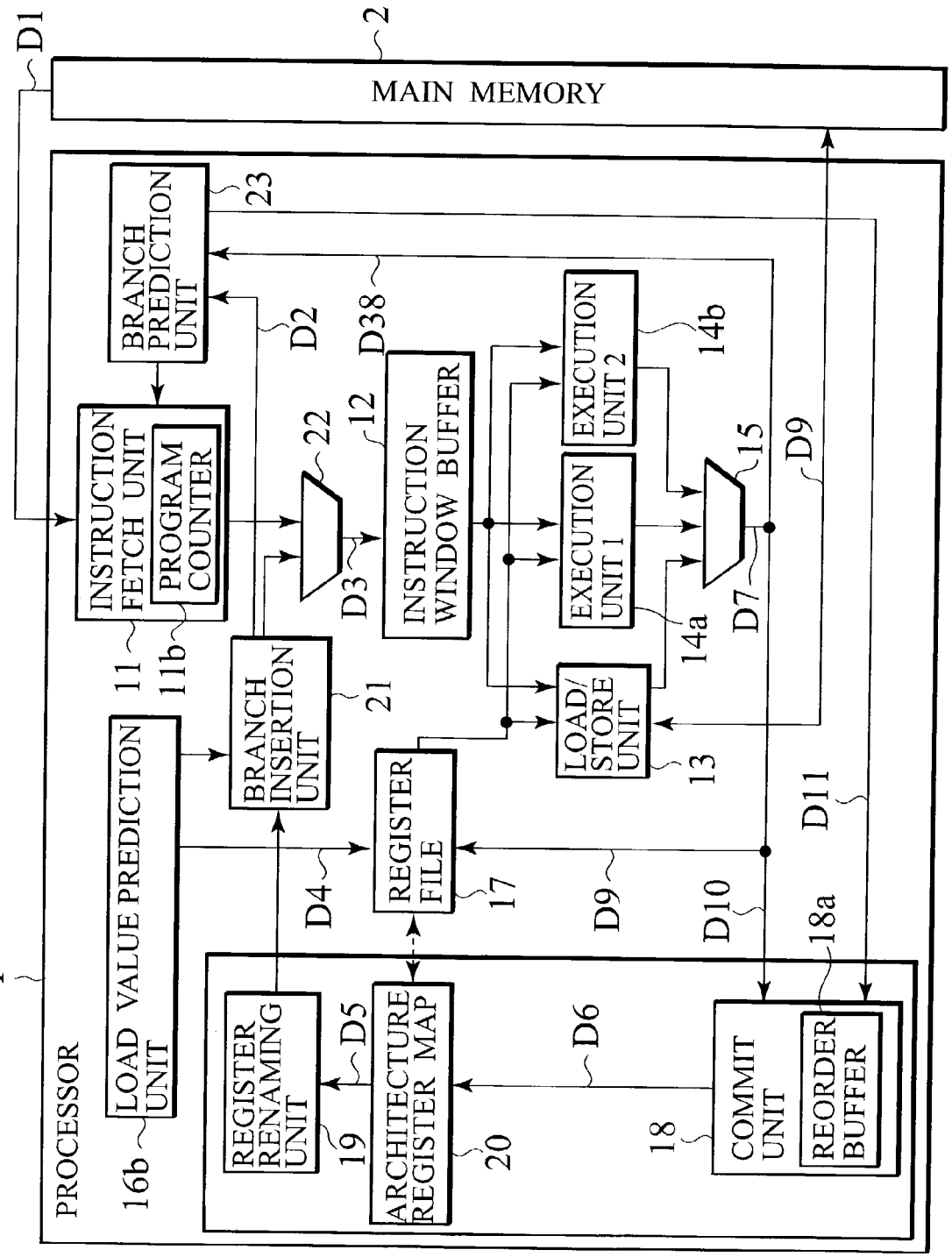
FIG. 17 is a block diagram illustrating an exemplary configuration of a processor having a value prediction unit according to an eighth embodiment.

Next, only those points of a speculative computer instruction execution control device and method for the same according to an eighth embodiment of the present invention differing from the first embodiment are described while referencing FIG. 16 and FIG. 17.

The eighth embodiment is different from the first embodiment in that the prediction control and recovery function for load value prediction described in the first embodiment is applied to value prediction that is not limited to load instruction.

The recovery control of the load value prediction unit described in the above embodiments may be applied to the recovery control of a prediction unit other than that for load value prediction. In other words, the recovery control of the prediction unit of the above embodiments may be applied to any prediction unit (prediction unit other than branch prediction) capable of verifying whether prediction is correct by branch instruction and is not limited to load value prediction.

Figure 1:
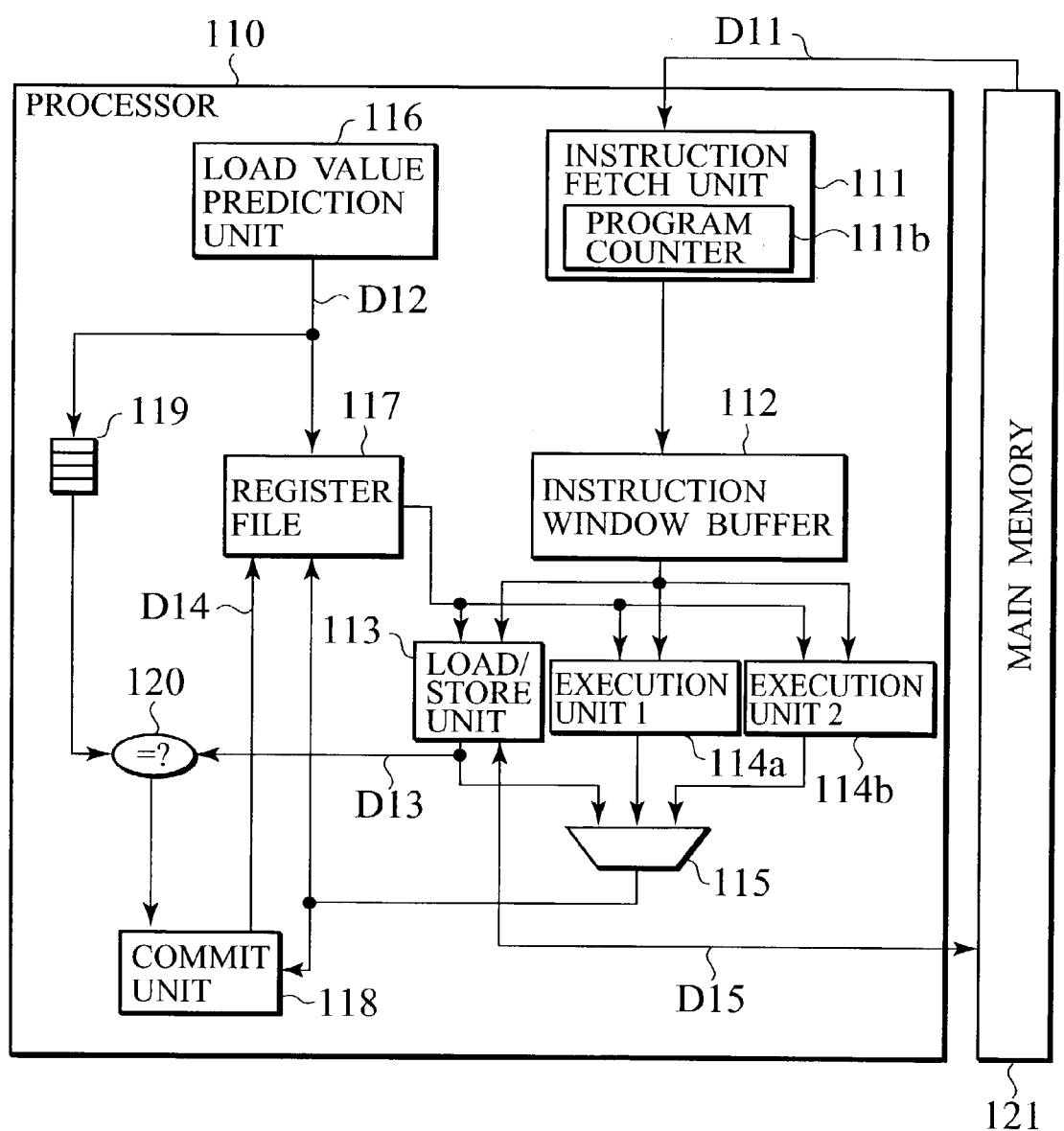
FIG. 1 is a block diagram illustrating an exemplary configuration of a processor having a load value prediction unit.

FIG. 16 illustrates an example of the configuration of a processor having a conventional value prediction unit. In comparison with the configuration of a processor having the conventional load value prediction unit shown in FIG. 1, the load value prediction unit 116 in FIG. 1 is substituted with the value prediction unit 116b in FIG. 16. In addition, when comparing the predicted value with a value that is obtained through actual instruction execution, only the load instruction result output from the load/store unit 113 is compared in FIG. 1, whereas, in the processor having the value prediction unit shown in FIG. 16, the results output from all execution units including the load/store unit 113, execution units 114a and 114b are targets for comparison.

FIG. 17 illustrates an example of the configuration of a processor having a value prediction unit according to the eighth embodiment. In comparison with the configuration of the processor having the load value prediction unit according to the first embodiment shown in FIG. 4, the load value prediction unit 16 in FIG. 4 is substituted with the value prediction unit 16b.

As shown in FIG. 17, while, in the configuration of the processor having the load value prediction unit according to the first embodiment shown in FIG. 4, value prediction is performed only for the load instruction; a processor having a value prediction unit according to the eighth embodiment performs value prediction for arbitrary instructions. When the value prediction unit 16 gives notification that an instruction that is a target for prediction is fetched, the branch insertion unit 21 according to the eighth embodiment inserts a branch instruction subsequent to the predicted instruction.

With the eighth embodiment, it is possible to speculatively execute not only load instruction, but also subsequent instructions based on value prediction of arbitrary instructions.

Ninth Embodiment

Figure 18:
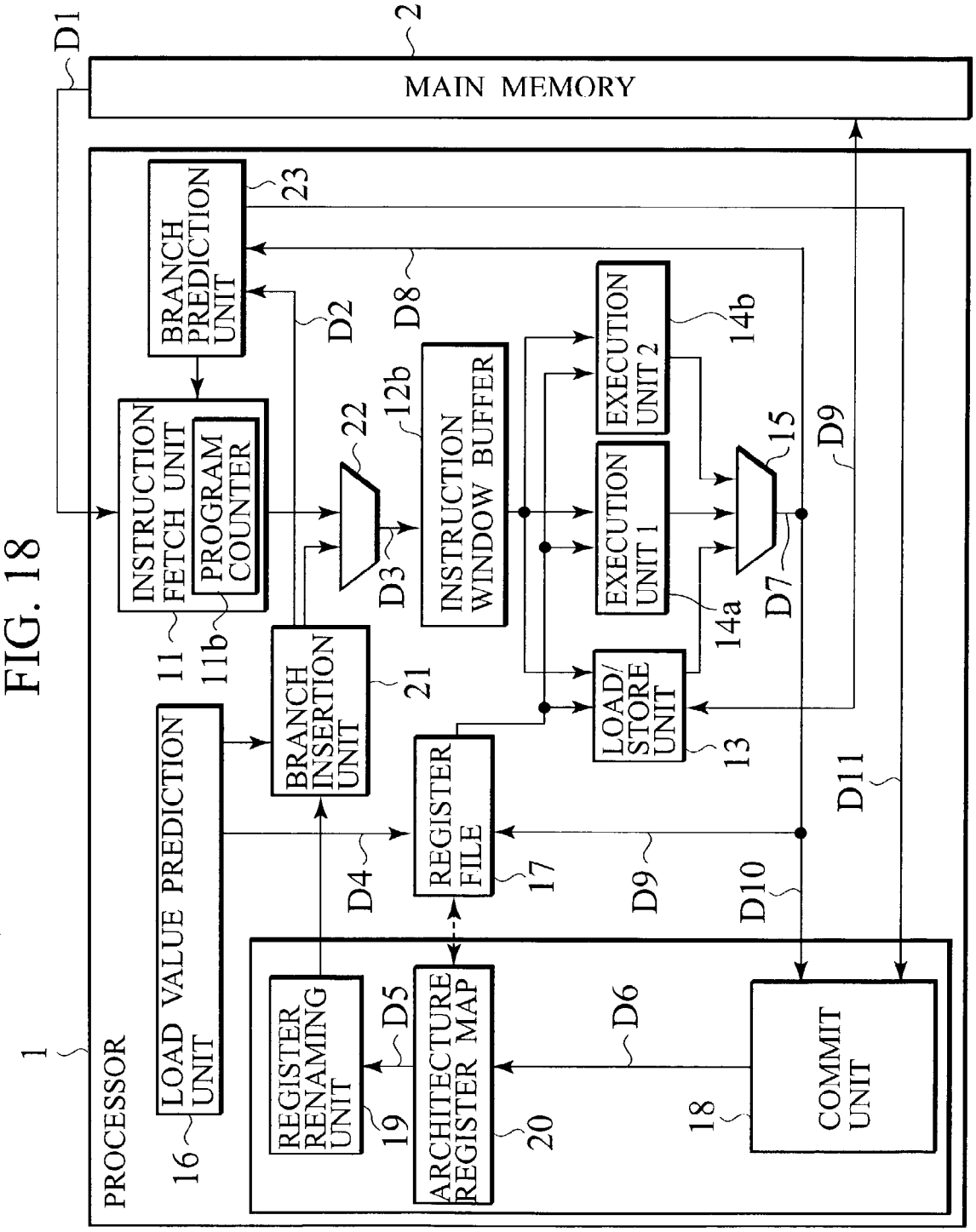
FIG. 18 is a block diagram illustrating an exemplary configuration of a processor having a load value prediction unit according to a ninth embodiment.

Next, only those points of a speculative computer instruction execution control device and method for the same according to a ninth embodiment of the present invention differing from the first embodiment are described while referencing FIG. 18.

The ninth embodiment is different from the first embodiment in that an out-of-order instruction issuing processor having a load value prediction unit described in the first embodiment is substituted with an in-order instruction issuing processor.

FIG. 18 illustrates an example of the configuration of a processor having a load value prediction unit according to the ninth embodiment. In comparison with the configuration of the processor having the load value prediction unit according to the first embodiment shown in FIG. 4, the configuration of a processor according to the ninth embodiment is different from the processor configuration according to the first embodiment in that the out-of-order instruction issuing instruction window buffer 12 in FIG. 4 is substituted with an in-order instruction issuing instruction window buffer 12b in FIG. 18, and the reorder buffer 18a in FIG. 4 is not included in FIG. 18.

If instructions subsequent to the branch that is the instruction inserted by the branch insertion unit 21, are executed without waiting for the predicted load instruction execution result even in the case of in-order instruction issuance, the processing speed of a processor increases through speculative instruction execution with value prediction. In other words, it is possible to execute subsequent instructions speculatively when the inserted branch instruction issued from the instruction window buffer 12b prior to the predicted load instruction execution result is obtained.

To give the instruction sequence obtained in the first embodiment shown in FIG. 10 as an example, if a branch instruction in the second line is issued prior to when the result of load instruction in the first line is obtained, subsequent addi instruction and add instruction may be issued (executed) without waiting for the load instruction execution result.

Even in the case of in-order instruction issuance, it may be assumed that the inserted branch instruction is issued prior to when the predicted load instruction execution result is obtained.

For example, in the case of a system where the load instruction execution result is bypassed to the branch instruction execution unit, even when branch instruction is issued prior to the load instruction result being determined, a necessary value, in other words the load result required for the execution unit or the execution units 14a and 14b that execute branch instruction in the branch instruction execution, becomes available. Accordingly, it is possible to issue inserted branch instruction prior to the predicted load instruction result is obtained.

To give another example, there is a system in which each execution unit has the function of holding instructions issued to the execution unit without executing the instructions. A unit implementing such a instruction holding function is generally called a reservation station. This reservation station holds instructions issued to each execution unit until the necessary operand becomes available and becomes executable in the execution unit. Accordingly, in such a system, instruction may be issued prior to the necessary operand becoming available.

More specifically, when a branch instruction inserted by the branch insertion unit 21 and an instruction subsequent to this branch instruction are respectively issued to different execution units, in other words, when they are held in different reservation stations, instructions subsequent to the branch instruction, that is, instructions subsequent to the load instruction become speculatively executable. This is because instructions subsequent to the branch instruction become executable independent of the execution of the branch instruction by being issued to different execution units.

With the ninth embodiment, even in an in-order instruction issuing processor, it is possible to obtain effects similar to the above embodiments.

In the above embodiments of the present invention, with the speculative instruction execution of the processor, it is possible to hold down increases in the cost of hardware required for verifying whether value prediction is correct and performing recovery control for a prediction error.

In addition, it is possible to implement verification of value prediction and recovery control for a prediction error with simple control without adding complicated control unit in order to perform value prediction that accompanies the speculative instruction execution. Accordingly, it becomes easy to verify and mount a control unit onto a processor.

It should be fully understood that the various embodiments that are not mentioned herein are included in the present invention. Accordingly, the present invention should not be limited only by the invention-specific materials related to the disclosure through the appropriate claims.

What is claimed is:

1. A control device for speculative instruction execution, comprising:
    an instruction fetch unit configured to fetch an instruction to be executed by a processor;
    a value prediction unit configured to predict a value to be obtained as an execution result of a target instruction for prediction in the case where the instruction fetched by the instruction fetch unit is the target instruction for prediction;
    a branch instruction insertion unit configured to generate and dynamically insert a virtual branch instruction subsequent to the target instruction for prediction for which a value is predicted by the value prediction unit, the virtual branch instruction comparing the predicted value of the target instruction with the execution result of the target instruction to determine whether a branch is to be taken or not;

an instruction issuing unit configured to hold a fetched instruction and speculatively issue an instruction subsequent to the target instruction for prediction to an execution unit without waiting for an execution result for the target instruction for prediction using the value predicted by the value prediction unit;

an execution unit configured to execute an instruction issued from the instruction issuing unit;

a branch prediction control unit configured to predict a branch destination for the virtual branch instruction and compare the predicted branch destination with the execution result of the virtual branch instruction after executing the virtual branch instruction; and a commit unit configured to commit each instruction executed by the execution unit, and, in a case that the predicted value and execution result of the target instruction turn out not to match by determining whether the predicted branch destination is correct or not, to invalidate and re-execute a speculatively executed instruction, wherein the branch instruction insertion unit sets the branch destination of the virtual branch instruction either to an instruction immediately after the target instruction for prediction or to the target instruction for prediction itself.

2. The device set forth in claim 1, further comprising:

a register renaming unit configured to rename a register to be used by an instruction in a group of instructions comprising a target instruction for prediction for which a value is predicted by the value prediction unit and an instruction subsequent to the target instruction for prediction;

wherein the branch instruction insertion unit dynamically inserts the virtual branch instruction subsequent to the target instruction for prediction in the group of instructions after a register that is an operand of the target instruction is renamed by the register renaming unit.

3. The device set forth in claim 1, further comprising:

a reorder unit configured to reorder instructions issued from the instruction issuing unit but not yet committed by the commit unit in the fetched order.

4. The device set forth in claim 1, wherein the value prediction unit performs no prediction of an execution result value of the target instruction for prediction when the target instruction for prediction is re-executed due to the predicted value and execution result not matching.

5. The device set forth in claim 1, wherein the value prediction unit sets the previous execution result value obtained by executing the target instruction for prediction as the predicted value when the target instruction for prediction is re-executed due to the predicted value and execution result not matching.

6. The device set forth in claim 1, wherein the branch instruction insertion unit sets the branch destination of the virtual branch instruction to be inserted immediately after the target instruction for prediction or immediately before an instruction having dependency on the target instruction for prediction.

7. The device set forth in claim 1, wherein the value prediction unit predicts a value to be loaded by the load instruction when the instruction fetched by the instruction fetch unit is a load instruction that is the target for prediction.

8. A method for controlling speculative instruction execution, comprising:

fetching an instruction to be executed by a processor;

predicting a value to be obtained as an execution result of the instruction using a value prediction unit when the fetched instruction is a target instruction for prediction;

generating and dynamically inserting a virtual branch instruction subsequent to the target instruction for prediction, the virtual branch instruction comparing the predicted value of the target instruction with the execution result of the target instruction to determine whether a branch is taken or not;

holding fetched instructions and speculatively issuing an instruction subsequent to the target instruction for prediction to an execution unit without waiting for the execution result of the target instruction for prediction using the value predicted by the value prediction unit;

executing instructions issued from the instruction issuing unit;

predicting a branch destination for the virtual branch instruction and comparing the predicted branch destination with an execution result of the virtual branch instruction after executing the virtual branch instruction; and committing each instruction, and, in a case that the predicted value and execution result of the target instruction turn out not to match by determining whether the predicted branch destination is correct or not, invalidating and re-executing speculatively executed instructions, wherein the branch instruction insertion unit sets the branch destination of the virtual branch instruction either to an instruction immediately after the target instruction for prediction or to the target instruction for prediction itself.

9. The method set forth in claim 8, further comprising:

renaming a register to be used by an instruction in the group of instructions comprising the target instruction for prediction for which a value is to be predicted by the value prediction unit and an instruction subsequent to the target instruction for prediction;

wherein the inserting of the branch instruction dynamically inserts the virtual branch instruction subsequent to the target instruction for prediction into the group of instructions after a register that is an operand of the target instruction is renamed through the register renaming.

10. The method set forth in claim 8, further comprising:

reordering instructions that have been issued but not yet committed in the fetched order.

11. The method set forth in claim 8, wherein the predicting of the value performs, when the target instruction for prediction is re-executed due to the predicted value and execution result not matching, no execution result value prediction for the target instruction for prediction.

12. The method set forth in claim 8, wherein the predicting of the value sets the previous execution result value obtained by executing the target instruction for prediction as the prediction value when the target instruction for prediction is re-executed due to the predicted value and execution result not matching.

13. The method set forth in claim 8, wherein
the inserting of the branch instruction inserts the virtual branch instruction to be inserted immediately after the target instruction for prediction or immediately before the instruction having dependency on the target instruction for prediction.

14. The method set forth in claim 8, wherein
the predicting of the value predicts the value to be loaded by the load instruction when the fetched instruction is a load instruction that is the target for prediction.

* * * * *